(12) United States Patent
Hamidifar et al.

(10) Patent No.: US 10,573,105 B2
(45) Date of Patent: *Feb. 25, 2020

(54) METHOD AND SYSTEM FOR MOBILE DEVICE LOCALIZATION-BASED ACCESS

(71) Applicant: MAPSTED CORP., Mississauga (CA)

(72) Inventors: Saeedeh Hamidifar, Mississauga (CA); Paramvir Singh Nagpal, Brampton (CA); Majid Bavand, Ottawa (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,784

(22) Filed: Feb. 7, 2019

(65) Prior Publication Data
US 2019/0304217 A1    Oct. 3, 2019

Related U.S. Application Data

(63) Continuation of application No. 15/944,407, filed on Apr. 3, 2018, now Pat. No. 10,249,116.

(51) Int. Cl.
*G07C 9/00* (2020.01)
*G01C 21/20* (2006.01)
(Continued)

(52) U.S. Cl.
CPC ........ *G07C 9/00111* (2013.01); *G01C 21/206* (2013.01); *G01S 5/0221* (2013.01); *G06F 21/6218* (2013.01); *H04L 63/0876* (2013.01); *H04L 63/107* (2013.01); *H04W 4/024* (2018.02); *H04W 4/80* (2018.02); *B60L 3/00* (2013.01); *G01C 21/00* (2013.01); *G01C 21/20* (2013.01); *G01C 21/36* (2013.01); *G01C 21/3617* (2013.01); *G01C 21/3676* (2013.01); *G01S 5/0252* (2013.01); *G01S 5/0278* (2013.01); *G01S 19/14* (2013.01); *G06F 17/00* (2013.01); *G06F 2221/2111* (2013.01); *G06F 2221/2141* (2013.01); *G06N 5/04* (2013.01); *G06N 20/00* (2019.01); *G06N 99/00* (2013.01);
(Continued)

(58) Field of Classification Search
CPC .............. G07C 9/00111; H04L 63/107; H04L 63/0876; H04W 4/80
See application file for complete search history.

(56) References Cited

U.S. PATENT DOCUMENTS

| | | | |
|---|---|---|---|
| 9,075,979 B1 * | 7/2015 | Queru | G06F 21/34 |
| 2008/0158053 A1 * | 7/2008 | Watanabe | G01C 21/28 |
| | | | 342/357.28 |

(Continued)

*Primary Examiner* — James J Yang
(74) *Attorney, Agent, or Firm* — Henry L. Ohab

(57) ABSTRACT

A method and system for facilitating an access request. The method may be executed in the processor of a server computing device and comprises receiving, at a memory of the server computing device, the request for access, the request for access performed using a security device at an access point device communicatively coupled to the server computing device, localizing a mobile computing device having a preestablished association with the security device, and enabling the request for access when a position of the mobile computing device as determined from the localizing is within a predetermined threshold distance from a location of the access point device.

20 Claims, 3 Drawing Sheets

(51) Int. Cl.
*G06F 21/62* (2013.01)
*G01S 5/02* (2010.01)
*H04W 4/024* (2018.01)
*H04W 4/80* (2018.01)
*H04L 29/06* (2006.01)
*H04W 4/029* (2018.01)
*G01C 21/00* (2006.01)
*H04B 10/114* (2013.01)
*H04W 64/00* (2009.01)
*G06N 99/00* (2019.01)
*B60L 3/00* (2019.01)
*G06F 17/00* (2019.01)
*G01C 21/36* (2006.01)
*G06N 5/04* (2006.01)
*G06N 20/00* (2019.01)
*G01S 19/14* (2010.01)
*H04W 4/33* (2018.01)

(52) U.S. Cl.
CPC ......... *H04B 10/1149* (2013.01); *H04W 4/029* (2018.02); *H04W 4/33* (2018.02); *H04W 64/00* (2013.01)

(56) References Cited

U.S. PATENT DOCUMENTS

| | | |
|---|---|---|
| 2009/0027165 A1* | 1/2009 | Cristache ................ G01S 13/82 340/10.1 |
| 2009/0043504 A1 | 2/2009 | Bandyopadhyay et al. |
| 2013/0303185 A1 | 11/2013 | Kim et al. |
| 2014/0141803 A1 | 5/2014 | Marti et al. |
| 2014/0176306 A1* | 6/2014 | Lee .................... G06K 7/10237 340/10.1 |
| 2014/0335893 A1 | 11/2014 | Ronen |
| 2016/0379074 A1 | 12/2016 | Nielsen et al. |

* cited by examiner

METHOD AND SYSTEM FOR MOBILE DEVICE LOCALIZATION-BASED ACCESS

CROSS-REFERENCE TO RELATED APPLICATION

This application claims the benefit of priority to U.S. application Ser. No. 15/944,407 filed Apr. 3, 2018, which in turn claims benefit of priority to U.S. Provisional Application No. 62/641,676 filed Mar. 12, 2018.

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed, or partially enclosed, urban infrastructure and buildings, including hospitals, shopping malls, airports, university campuses and industrial warehouses. Pedestrian navigation or positioning solutions may rely on sensors including accelerometers, gyroscopes, and magnetometers that may be commonly included in mobile phones and other mobile computing devices, in conjunction with acquired wireless communication signal data and magnetic field data to localize pedestrian users in possession of such a mobile device.

DETAILED DESCRIPTION

Figure 1:
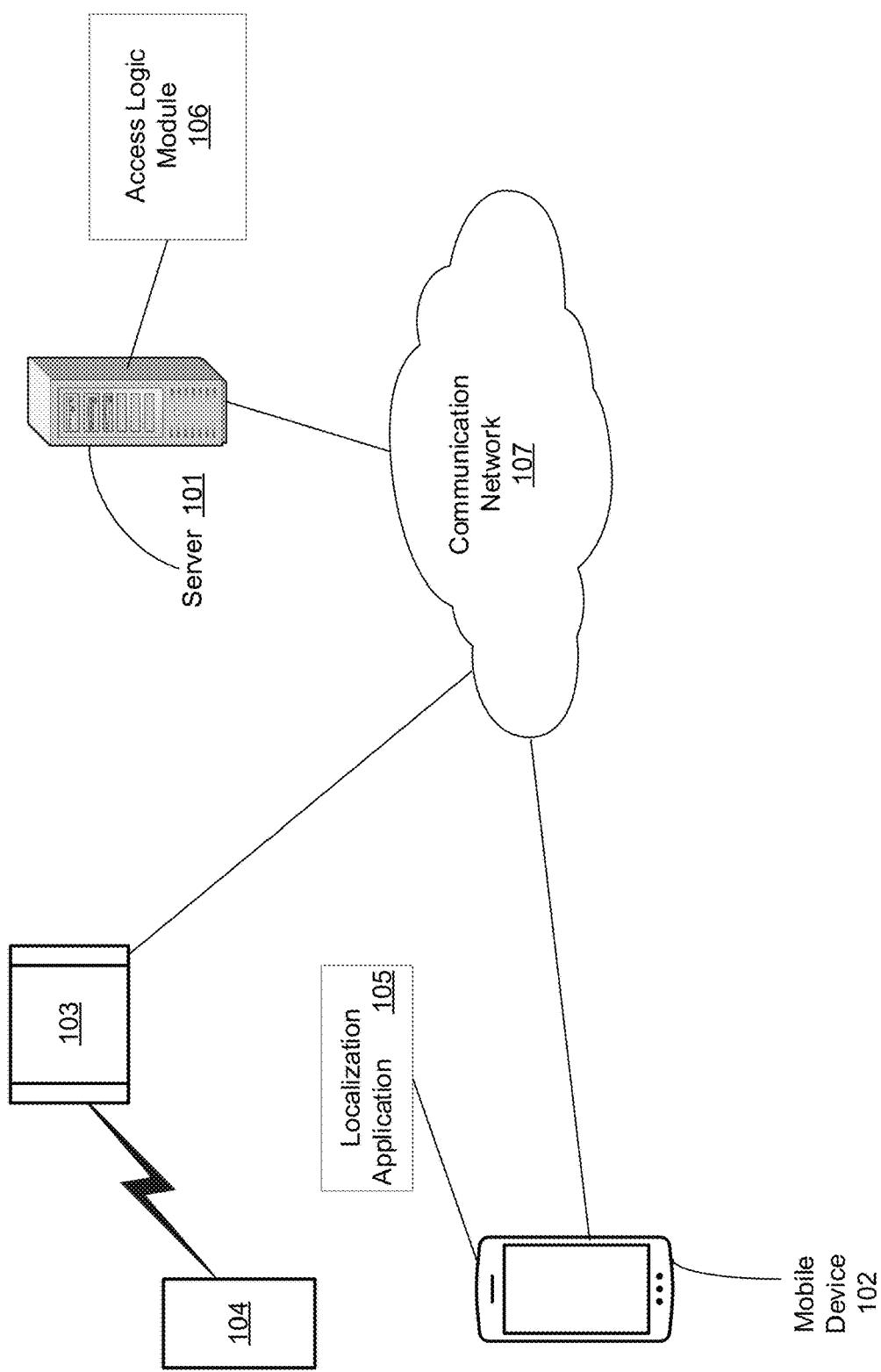
FIG. 1 illustrates, in an example embodiment, a server-based system for monitoring and enabling a request for access.

Among other benefits and technical effect, embodiments provided herein allow verification of a request for access performed at a unique position or location, based on contemporaneously and independently localizing a mobile device such as may be carried by user performing the access request. A method, executed at least partly in a processor of a server computing device, is provided that comprises receiving, at a memory of the server computing device, the request for access, the request for access performed using a security device at an access point device communicatively coupled to the server computing device, localizing a mobile computing device having a preestablished association with the security device, and enabling the request for access when a position of the mobile computing device as determined from the localizing is within a predetermined threshold distance from a location of the access point device.

The terms localize, or localization, as used herein refer to determining a unique coordinate position of the mobile device at a specific location along a route being traversed relative to the indoor area or facility. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

The indoor facility, in embodiments, may be an indoor area within any one of a shopping mall, a warehouse, a factory building, an airport facility, a hospital facility, a university campus facility or any at least partially enclosed building, in one embodiment being accessible along a pedestrian route. The term pedestrian as used herein is intended not encompass not only walking pedestrians, but also users of mobile phones moving at typical pedestrian speeds, for example at less than 10 miles per hour using automated means within the pedestrian area, including but not limited to automated wheelchairs or automated people-moving indoor carts.

A server computing device-based system for facilitating a request for access is also provide. The system comprises a processor and a memory. The memory includes instructions executable in the processor to receive, at a memory of the server computing device, the request for access, the request for access performed using a security device at an access point device communicatively coupled to the server computing device, localize a mobile computing device having a preestablished association with the security device, and enable the request for access when a position of the mobile computing device as determined from the localizing is within a predetermined threshold distance from a location of the access point device.

One or more embodiments described herein provide that methods, techniques, and actions performed by a computing device are performed programmatically, or as a computer implemented method. Programmatically, as used herein, means through the use of code or processor executable instructions. These instructions can be stored in one or more memory resources of the computing device, including a non-transitory medium storing the processor executable instructions. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, server-based system 100 for facilitating a request for access, such as to an entrance along a pedestrian route to an indoor facility or building. Mobile device 102 may be such as a cellular or smartphone, a laptop or a tablet computer, or a wearable computer device that may be operational for any one or more of telephony, data communication, and data computing. Mobile device 102 may include fingerprint data of an indoor facility and proximate pedestrian area stored in a local memory. In other variations, mobile device 102 may be connected within computer network communication system 107, such as the internet or other wide area network, to one or more remote server computing device(s) storing the fingerprint data, with the latter being communicatively accessible to mobile device 102 for download into a local memory of mobile device 102.

A pedestrian navigation, indoor positioning or localization software application 105 may be downloaded, installed, and stored locally in a memory of mobile device 102, and configured to render a physical layout map of an indoor facility and proximate pedestrian area within a user interface display of mobile device 102. In one embodiment, localization application 105 may incorporate one or more portions of processor-executable instructions manifesting a capability for indoor navigation or positioning based at least on fingerprint data of the facility. Localization application 105 may be constituted of logic instructions executable in a processor of mobile device 102 in one embodiment, and provides, at least in part, capability for localizing mobile device 102. The terms localize or localization as used herein refer to determining an estimated coordinate position (x, y, z) along a route or trajectory being traversed in or proximate an indoor facility by mobile device 102 in accompaniment of a user, in an embodiment.

Mobile device 102 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. Mobile device 102 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 102 further includes the capability for detecting, via sensor devices, and measuring a received signal strength, and of determining signal connectivity parameters, related to the ambient wireless signals. In particular, mobile device 102 may include location determination capability such as by way of a GPS module having a GPS receiver, and a communication interface for communicatively coupling to communication network 107, including by sending and receiving cellular data over data and voice channels.

Localization application 105 of mobile device 102 includes instructions stored in memory 202 of mobile device 102, the instructions being executable in a processor of mobile device 102, to localize mobile device 102 in terms of determining position or location coordinates, such as (x, y, z) coordinates expressed according to a local or a global coordinate system. In alternate embodiments, it is contemplated that any one or more or portions of localization application 105 may be located at remote server device 101 and communicatively accessible to mobile device 102 via network communication interface 207.

A fingerprint data repository, or any portion(s) thereof, may be stored in server device 101, and made communicatively accessible to mobile device 102 via communication network 107. Server 101 may include access logic module 106 for facilitating access to an entrance of an indoor facility, in an embodiment. In some embodiments, it is contemplated that the fingerprint data repository, or any portions of data and processor-executable instructions constituting the fingerprint data repository, may be downloaded for storage, at least temporarily, within a memory of mobile device 102. In embodiments, the fingerprint map data stored in the fingerprint data repository further associates particular positions along pedestrian route of the facility or indoor area with any combination of fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at unique locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility. The magnetic field information may include magnetic field strength and direction measurements, and also determined magnetic spatial derivative parameters. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101. Server 101 may store respective fingerprint maps of various buildings and indoor areas. The respective building or indoor facility fingerprint maps, or any portions thereof, may be downloaded into a memory of mobile device 102 for use in conjunction with the pedestrian navigation software application executing thereon.

A particular fingerprint or signature based on any of received wireless communication signal strength and signal connectivity parameters, magnetic field parameters or barometric pressure parameters, and mobile device inertial sensor data may be detected or recorded by mobile device 102, whereupon the fingerprint or signature as detected may be matched to a reference fingerprint, or a reference pattern including a set of fingerprints, in a stored fingerprint map of a given facility made accessible to localization application 105 to identify a unique position of mobile device 102 along a route being traversed. As used herein, term signal connectivity, as distinguished from a signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of mobile device 102 along a sequence of positions that constitute a pedestrian route within, and even adjoining, the indoor facility.

Security device 104, in an embodiment, may be a portable magnetic- or near field communication (NFC)-enabled card encoded with access or security credential details unique to a particular user. Mobile device 102 may also be associated with that given user. The association of user access credential parameters, such as but not limited to a user identity and security level entitlement, shared in common with both mobile device 102 and security device 104, may be registered with server device 101. In an embodiment, a unique access device 104 is linked to a given mobile device 102, as representative of a particular user who, in accordance with security credentials established and registered at server 101, is entitled to possession of a given mobile device 102 in association with a unique security device 104.

Access point device 103, also enabled with magnetic and NFC capability, in one embodiment may be a fixed location access point device capable of recognizing, recording and responding to an access request initiated using security device 104, such as performed by a swiping action of security device 104 upon or proximate access point device 103. Access point device 103 may be fixed in location, deployed in conjunction with ingress or egress means to an indoor facility, in an embodiment.

In one variation, access point device 103 may be configured to induce or emit a pattern of predetermined magnetic characteristics unique to its particular coordinate position as deployed relative to the indoor facility. In one embodiment, the equipment constituting access point device 103 may be specially selected and configured based on a proclivity for inducing and establishing magnetic characteristics, such as magnetic field magnitude, dip angle and orientation, in a manner that is controllable, stable, repeatable, and persistent over time, to the extent possible. The particular magnetic characteristics associated with access point device 103 thus established may be recorded, again as part of a magnetic fingerprint calibration process for instance, stored as a magnetic signature, pattern, or characteristic unique to that position, including but not limited to spatial derivative magnetic fingerprint that is calculated based on magnetic fingerprint data acquired at positions along a trajectory of mobile device proximate access point device 103. Determining a magnetic spatial derivative signature captures the relative changes in magnetic field as a mobile device 102 traverses a route proximate access point device 103. The magnetic field characteristics and magnetic spatial derivative signature as determined may be used to localize, or estimate a position of, mobile device 102 relative to that location of deployment of access point device 103.

Figure 2:
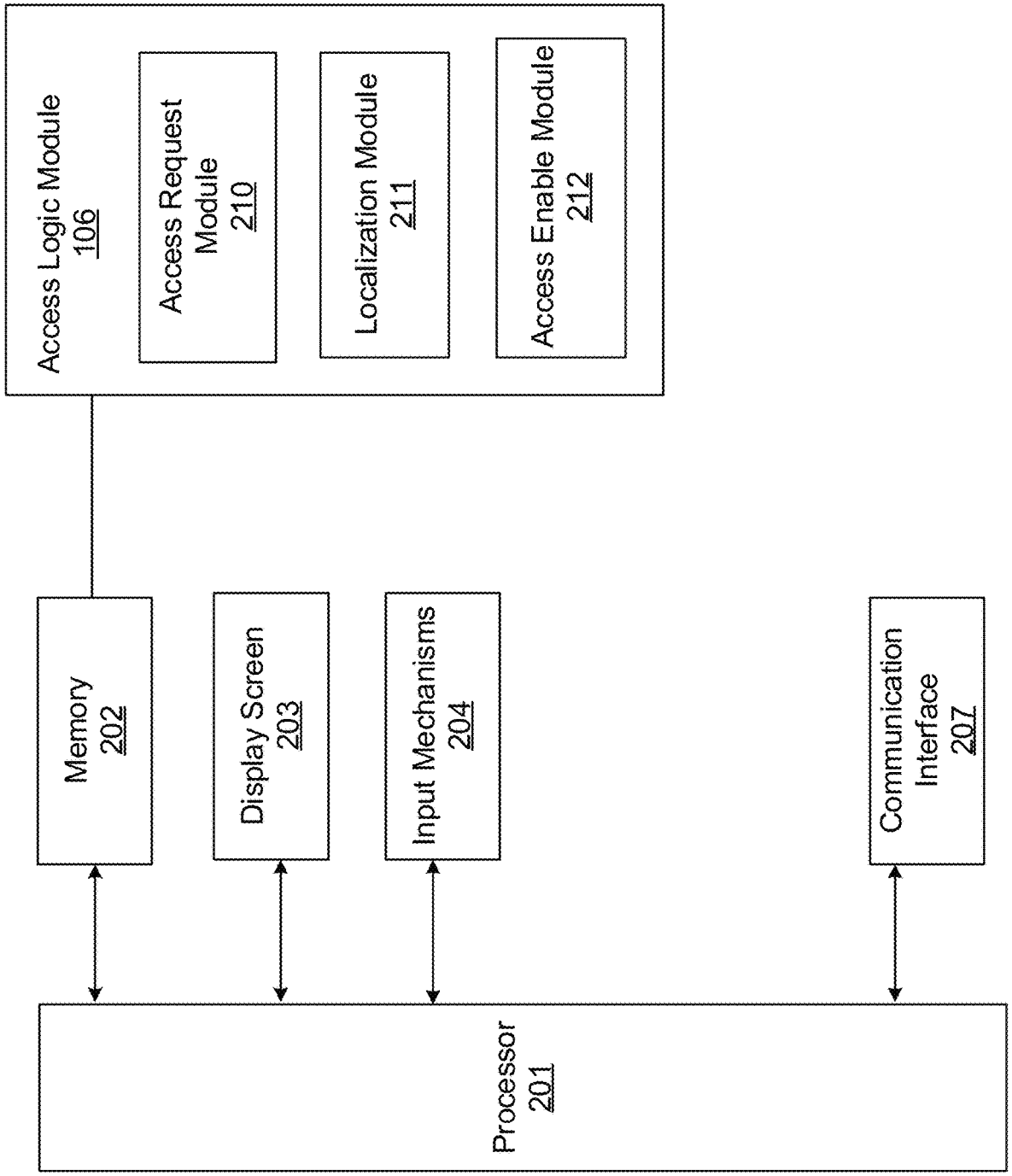
FIG. 2 illustrates, in one example embodiment, an architecture of a server computing device for monitoring and enabling a request for access.

FIG. 2 illustrates an example embodiment architecture 200 of server computing device 101 for monitoring and enabling a request for access. Server 101, in embodiment architecture 200, may be implemented on one or more server devices, and includes processor 201, memory 202 which may include a read-only memory (ROM) as well as a random access memory (RAM) or other dynamic storage device, display screen or device 203, input mechanisms 204 and communication interface 207 communicatively coupled to communication network 107. Processor 201 is configured with software and/or other logic to perform one or more processes, steps and other functions described with implementations, such as described by FIGS. 1 through 3 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may include access logic module 106 constituted of access request module 210, localization module 211 and access enable module 212. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of any one, or both, of the wired and wireless network links. Using the network link, server 101 can communicate with mobile computing devices 102.

Processor 201 uses executable instructions of access request module 210 to acquire localization data of mobile device 102, as localized within the pedestrian area based on using fingerprint data of the indoor facility and proximate area. In other variations, localization of at least some of mobile device 102 may be performed at server 101 based on sensor and wireless signal data, and magnetic data, as acquired at mobile device 102 and communicated to server 101 via communication network 107.

Processor 201 uses executable instructions stored in localization module 211 to estimate a coordinate position or location of mobile device 102, and also a confidence level indicative of a degree of accuracy for the estimated position. Since the accuracy associated with estimating the position, or location, of mobile device 102 as a consequence of localization is not absolute, but rather is subject to the statistical, or probabilistic, nature of the fingerprint parameters, including but not limited to the inherently probabilistic nature of wireless radio frequency signal parameters as received.

Processor 201 uses executable instructions stored in access enable module 212 to enable a request for access when a position of mobile device 102 as determined from the localizing is within a predetermined threshold distance from a location of the access point device 103.

Methodology

Figure 3:
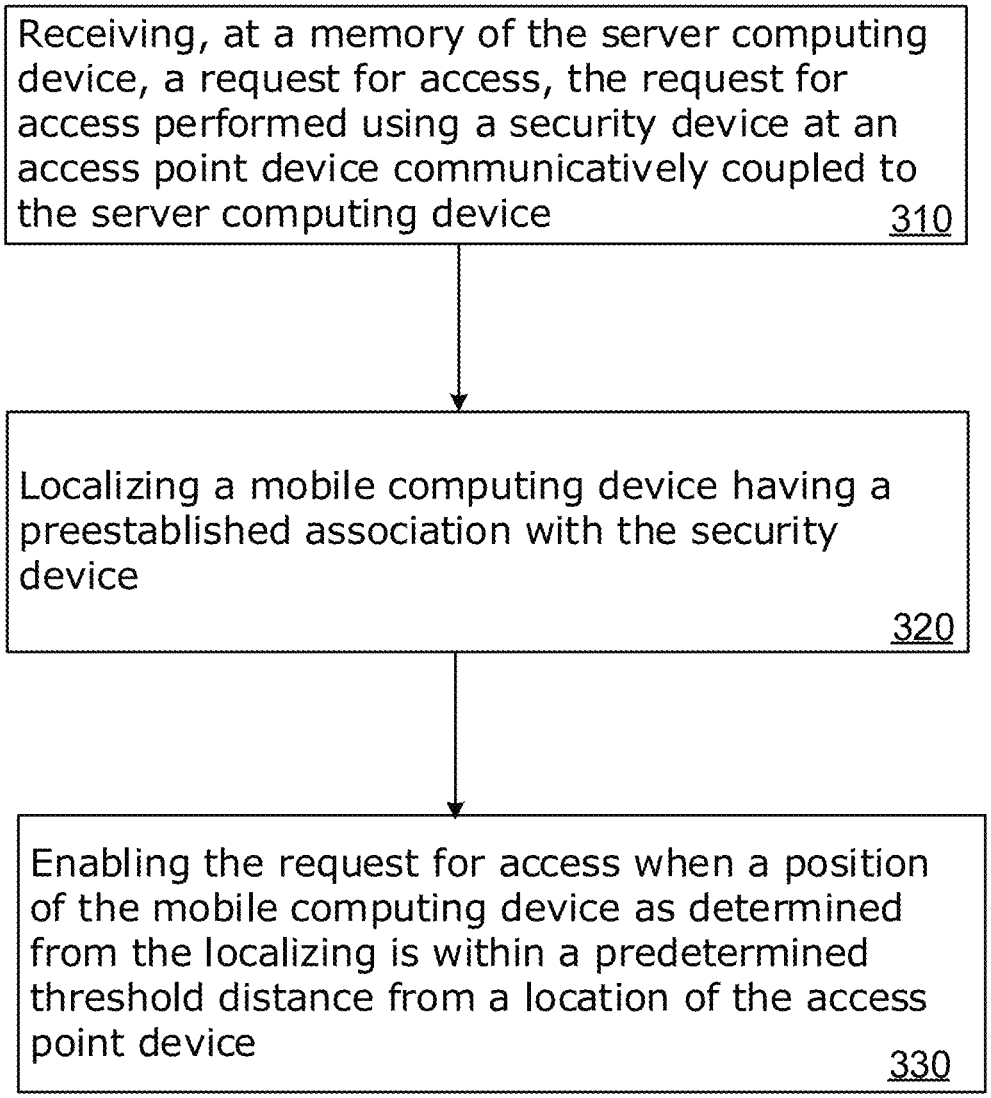
FIG. 3 illustrates an example embodiment of a method of monitoring and enabling a request for access.

FIG. 3 illustrates an example embodiment method 300 of localizing mobile device 102 within access request system 100. In describing examples of FIG. 3, reference is made to the examples of FIGS. 1-2 for purposes of illustrating suitable components or elements for performing a step or sub-step being described.

Examples of method steps described herein relate to the use of server computing device 101 in conjunction with at least mobile device 102 for implementing the techniques described. According to one embodiment, the techniques are performed by access request logic module 106 of server 101 and localization application 105 of mobile device 102 in response to the processor 201 executing one or more sequences of software logic instructions that constitute localization application 105. In embodiments, localization application 105 may include the one or more sequences of instructions within sub-modules including access request module 210, and localization module 211, and access enable module 212. Such instructions may be read into memory 202 from machine-readable medium, such as memory storage devices, or downloaded into memory 202 via network communication interface 207. In executing the sequences of instructions of access request module 210, localization module 211 and access enable module 212 of localization application 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between mobile device 102 and a remote but communicatively accessible server computing device.

At step 310, processor 201 executes instructions included in access request module 210 to receive, at memory 202 server computing device 101, the request for access, the request for access performed using security device 104 upon access point device 103. Access point device 103 may be communicatively coupled to server computing device 101.

At step 320, processor 201 executes instructions included in localization module 211 to localize mobile computing device 102 in possession of a user that requests access using security device 104 at access point device 103, such as upon entering or exiting an indoor facility, in one embodiment. The localizing may be based on any one or more of an orientation, a magnetic field strength and direction, a magnetic field spatial derivative signature, a received wireless communication signal strength, a wireless connectivity indication and a barometric pressure in accordance with fingerprint data of the indoor facility that deploys access point device 103. Localizing of mobile device 102 is performed generally contemporaneously with the receipt of the access request at server 101, which in one embodiment, may be a time delay that ranges from 1-5 seconds of the access request.

As would be appreciated by those of skill in the art, any localization, or location determination, of mobile device 102 that is based, even at least partly, on fingerprint data constituted of radio frequency (RF) signal data, sensor data and magnetic field data, cannot be guaranteed with an absolute certainty of one hundred percent. For instance, considering a Bluetooth Low Energy (BLE) wireless RF signal context for illustration purposes, such a BLE signal as broadcast in the 2.4 GHz radio frequency may be may be distorted and attenuated by interference from specific elements in the environment of the pedestrian area. Such signal interfering elements may include metallic surfaces bouncing the BLE signal off the surface in unexpected ways as it is unable to penetrate the material, BLE signal absorption, attenuation and distortion caused by human body mass absorbing, water, concrete, marble and brick structures and distorting BLE signal, other mobile device 102 and other electronic devices operating in the 2.4 GHz frequency, fluorescent lighting emitting signals in the 2.4 GHz frequency, and electric power lines, for example. When the BLE signal is distorted, due to signal interference, for example, a receiving mobile device will receive a signal that does not reflect the real situation, e.g. the distance to a fingerprint data point or position might not be accurate, since the accuracy levels are affected by various sources of signal distortion and not reflective of actual (x, y) coordinate that might be determined from localization.

In some embodiments, instructions included in localization module 211 may be executable in processor 201 to determine a respective confidence level indicative of a degree of accuracy for the first and the at least a second estimated positions, given that the accuracy associated with estimating the position, or location, of a mobile device 102 as a consequence of localization is not absolute, but rather is subject to the statistical, or probabilistic, nature of the fingerprint parameters, including but not limited to the inherently probabilistic nature of wireless radio frequency signal parameters as received. In some embodiments, a degree of accuracy associated with the position estimation may be indicated by a confidence level that is determined for, and assigned in conjunction with, estimated first and second positions as localized. As a measure of the accuracy of localization of mobile device 102, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = \frac{1}{N-1}\sum(x - \mu_x)^2$$
$$\sigma_y^2 = \frac{1}{N-1}\sum(y - \mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position comprises a probabilistic estimate expressed as a confidence level.

At step 330, processor 201 of server 101 executes instructions included in access enable module 212 to enable the request for access when a position of mobile computing device 102 as determined from the localizing is within a predetermined threshold distance from a location of access point device 104. In one variation, upon a user in possession of both mobile device 102 and security device 104 performing a request for access, such as by a swipe action using security device 104 upon access point device 103, server 101 may enable facility access for the user only if, at a time generally coincident with receiving or recognizing the swipe action, mobile device 102 is localized to a coordinate position that is within a given predetermined distance threshold, ranging from 1 meter to 3 meters in one embodiment, of the known location of access point device 103. In another embodiment, the user of security card 104 may be denied access, thereby limiting a likelihood of unauthorized ingress and egress from the indoor facility, if mobile device 102 position as localized does not match the fixed, known location of access point device 103, at the time that security card 104 is used to perform the swipe action at access point device 104.

In other variations, the distance threshold may not be fixed and predetermined, but instead may be dynamically set or adjusted by server device 101, depending on the confidence level associated with the localizing of mobile device 102. For instance, a lower probability, or lower confidence level, associated with the localizing may result in the distance threshold being increased or adjusted higher, while a confidence level associated with the localizing may result in the distance threshold being reduced or dynamically set lower.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method of facilitating a request for access, the method executed in a processor of a server computing device and comprising:
   receiving, at a memory of the server computing device, an input from a security device associated with a request for access at an access point device communicatively coupled to the server computing device, the access point device inducing a magnetic signature unique to a location of the access point device, the magnetic signature including a magnetic spatial derivative signature capturing relative changes in a magnetic field corresponding to a sequence of positions as a mobile device traverses a route proximate the access point device;
   localizing the mobile device having a preestablished association with the security device, based on the magnetic signature; and
   enabling the request for access, based at least in part on the localizing.

2. The method of claim 1 wherein the security device comprises at least one of a magnetic and a near field communication (NFC) portable security card.

3. The method of claim 1 wherein the access point device is one of a magnetic access point and a near field communication (NFC) access point device.

4. The method of claim 1 wherein the localizing is based on at least one of an orientation, a magnetic field strength and direction, a received wireless communication signal strength, a wireless connectivity indication and a barometric pressure in accordance with fingerprint data of an indoor facility.

5. The method of claim 4 wherein the fingerprint data includes respective time-stamps whereby the orientation, the magnetic field strength and direction, the magnetic field spatial derivative signature, the received wireless signal strength, the wireless connectivity indication and the barometric pressure are correlated in accordance with the respective time-stamps.

6. The method of claim 5 wherein the access point device is located along a pedestrian route.

7. The method of claim 1, wherein the access is enabled when a position of the mobile computing device as determined from the localizing is within a predetermined threshold distance from the location of the access point device.

8. The method of claim 7 wherein the position of the mobile device comprises a confidence level indicative of a degree of accuracy for the estimated position.

9. The method of claim 8 wherein the threshold distance is dynamically adjusted as one of a lower and a higher based on the confidence level.

10. The method of claim 8, wherein the confidence level associated with the location estimate is obtained by fusing probabilistic results of multiple concurrent location estimates of the mobile device.

11. A server computing system for facilitating a request for access, the system comprising:
    a processor; and
    a memory including instructions executable in the processor to:
       receive, at a memory of the server computing device, an input from a security device associated with a request for access at an access point device communicatively coupled to the server computing device, the access point device inducing a magnetic signature unique to a location of the access point device, the magnetic signature including a magnetic spatial derivative signature capturing relative changes in a magnetic field corresponding to a sequence of positions as a mobile device traverses a route proximate the access point device;
       localize the mobile device having a preestablished association with the security device, based on the magnetic signature; and
       enable the request for access, based at least in part on the localizing.

12. The system of claim 11 wherein the security device comprises at least one of a magnetic and a near field communication (NFC) portable security card.

13. The system of claim 11 wherein the access point device is one of a magnetic access point and a near field communication (NFC) access point device.

14. The system of claim 11 wherein the localizing is based on at least one of an orientation, a magnetic field strength and direction, a received wireless communication signal strength, a wireless connectivity indication and a barometric pressure in accordance with fingerprint data of an indoor facility.

15. The system of claim 14 wherein the fingerprint data includes respective time-stamps whereby the orientation, the magnetic field strength and direction, the magnetic field spatial derivative signature, the received wireless signal strength, the wireless connectivity indication and the barometric pressure are correlated in accordance with the respective time-stamps.

16. The system of claim 15 wherein the access point device is located along a pedestrian route.

17. The system of claim 11 wherein the access is enabled when a position of the mobile computing device as determined from the localizing is within a predetermined threshold distance from the location of the access point device.

18. The system of claim 17 wherein the position of the mobile device comprises a confidence level indicative of a degree of accuracy for the estimated position.

19. The system of claim 18 wherein the threshold distance is dynamically adjusted as one of a lower and a higher based on the confidence level.

20. The system of claim 18, wherein the confidence level associated with the location estimate is obtained by fusing probabilistic results of multiple concurrent location estimates of the mobile device.

* * * * *